(12) United States Patent
Shen et al.

(10) Patent No.: US 9,389,905 B2
(45) Date of Patent: Jul. 12, 2016

(54) SYSTEM AND METHOD FOR SUPPORTING READ-ONLY OPTIMIZATION IN A TRANSACTIONAL MIDDLEWARE ENVIRONMENT

(71) Applicant: Oracle International Corporation, Redwood Shores, CA (US)

(72) Inventors: Xugang Shen, Beijing (CN); Qingsheng Zhang, Beijing (CN); Todd J. Little, Palatine, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 229 days.

(21) Appl. No.: 13/828,906

(22) Filed: Mar. 14, 2013

(65) Prior Publication Data

US 2013/0254782 A1    Sep. 26, 2013

Related U.S. Application Data

(60) Provisional application No. 61/612,144, filed on Mar. 16, 2012.

(51) Int. Cl.
| | |
|---|---|
| *G06F 17/30* | (2006.01) |
| *G06F 9/46* | (2006.01) |
| *G06F 15/167* | (2006.01) |
| *H04L 29/08* | (2006.01) |
| *G06F 3/06* | (2006.01) |

(52) U.S. Cl.
CPC ............ *G06F 9/466* (2013.01); *G06F 3/0659* (2013.01); *G06F 15/167* (2013.01); *G06F 17/30289* (2013.01); *H04L 67/02* (2013.01); *H04L 67/10* (2013.01)

(58) Field of Classification Search
CPC ............ G06F 17/30575; G06F 17/30; G06F 17/30008; G06F 17/30377; G06F 17/30578; G06F 9/466; G06F 11/1474; G06F 11/004; G06F 9/5038; H04L 67/1095; H04L 67/32
USPC ........... 1/1; 707/610, 648, 649, 682, 999.008, 707/999.2, 999.202; 709/203; 718/101, 102
See application file for complete search history.

(56) References Cited

U.S. PATENT DOCUMENTS

| | | | |
|---|---|---|---|
| 5,261,089 A | * | 11/1993 | Coleman et al. |
| 5,452,445 A | * | 9/1995 | Hallmark et al. |
| 5,555,396 A | | 9/1996 | Alferness et al. |
| 5,617,537 A | | 4/1997 | Yamada et al. |
| 6,070,202 A | | 5/2000 | Minkoff et al. |
| 6,154,847 A | | 11/2000 | Schofield et al. |
| 6,470,342 B1 | | 10/2002 | Gondi et al. |
| 6,629,153 B1 | | 9/2003 | Gupta |
| 6,754,842 B2 | | 6/2004 | Kettley et al. |
| 7,103,597 B2 | | 9/2006 | McGoveran |

(Continued)

*Primary Examiner* — Dennis Truong
(74) *Attorney, Agent, or Firm* — Tucker Ellis LLP

(57) ABSTRACT

A system and method can support processing a transaction with a plurality of transaction branches. A transaction manager operates to send, to a resource manager, a prepare request for each said transaction branch in the plurality of transaction branches with the exception of at least one transaction branch. Furthermore, after receiving an indication from the resource manager that the received preparation requests are handled successfully (i.e. the transaction branch is read-only and has been committed), the transaction manager operates to send a commit request to commit said at least one transaction branch, which is on hold, to the resource manager.

20 Claims, 7 Drawing Sheets

(56) References Cited

U.S. PATENT DOCUMENTS

| | | |
|---|---|---|
| 7,380,155 B2 | 5/2008 | Fung et al. |
| 7,430,740 B1 | 9/2008 | Molloy et al. |
| 7,694,178 B2 | 4/2010 | Hobson |
| 7,743,036 B2 | 6/2010 | Cotner et al. |
| 7,822,727 B1 * | 10/2010 | Shaughnessy .... G06F 17/30371 707/703 |
| 7,913,261 B2 | 3/2011 | Mitchell et al. |
| 7,970,737 B2 | 6/2011 | Parkinson |
| 8,671,085 B2 | 3/2014 | Dhamankar et al. |
| 8,738,964 B2 | 5/2014 | Markus |
| 8,868,506 B1 * | 10/2014 | Bhargava et al. ............. 707/648 |
| 9,146,944 B2 * | 9/2015 | Parkinson ......... G06F 17/30289 |
| 2001/0047436 A1 | 11/2001 | Sexton et al. |
| 2002/0023129 A1 | 2/2002 | Hsiao et al. |
| 2002/0116568 A1 | 8/2002 | Oksanen |
| 2002/0144006 A1 | 10/2002 | Cranston et al. |
| 2003/0005172 A1 | 1/2003 | Chessell |
| 2003/0035372 A1 | 2/2003 | Schaub |
| 2003/0154423 A1 | 8/2003 | Egolf |
| 2004/0015079 A1 | 1/2004 | Berger et al. |
| 2004/0123293 A1 | 6/2004 | Johnson |
| 2004/0153349 A1 * | 8/2004 | K. et al. ............................. 705/7 |
| 2004/0153450 A1 * | 8/2004 | K. et al. ............................. 707/8 |
| 2004/0158549 A1 * | 8/2004 | Matena et al. .................... 707/1 |
| 2005/0044551 A1 | 2/2005 | Sodhi |
| 2005/0144171 A1 | 6/2005 | Robinson |
| 2005/0144299 A1 | 6/2005 | Blevins |
| 2005/0262055 A1 | 11/2005 | Newport |
| 2006/0075277 A1 | 4/2006 | Johnson et al. |
| 2006/0080668 A1 | 4/2006 | Blackmore et al. |
| 2006/0136887 A1 * | 6/2006 | Kaczynski et al. ............ 717/151 |
| 2006/0149791 A1 | 7/2006 | Sinha et al. |
| 2006/0179125 A1 | 8/2006 | Pavlik et al. |
| 2006/0235853 A1 * | 10/2006 | Luo ........................ G06F 9/466 |
| 2007/0041392 A1 | 2/2007 | Kunze et al. |
| 2007/0079077 A1 | 4/2007 | Baines et al. |
| 2007/0156729 A1 | 7/2007 | Shaylor |
| 2007/0165625 A1 * | 7/2007 | Eisner .................... G06F 9/546 370/389 |
| 2008/0127219 A1 | 5/2008 | Lacombe et al. |
| 2008/0147945 A1 | 6/2008 | Zimmer |
| 2008/0177955 A1 | 7/2008 | Su |
| 2008/0243865 A1 * | 10/2008 | Hu et al. .......................... 707/10 |
| 2008/0250074 A1 | 10/2008 | Parkinson |
| 2009/0070330 A1 * | 3/2009 | Hwang et al. ..................... 707/8 |
| 2009/0158397 A1 | 6/2009 | Herzog et al. |
| 2009/0172153 A1 * | 7/2009 | Cohen .................... H04L 67/02 709/224 |
| 2009/0248765 A1 * | 10/2009 | Akidau et al. ................. 707/205 |
| 2009/0292744 A1 | 11/2009 | Matsumura |
| 2010/0042999 A1 * | 2/2010 | Dorai et al. .................... 718/101 |
| 2010/0169284 A1 * | 7/2010 | Walter et al. .................. 707/682 |
| 2010/0198920 A1 | 8/2010 | Wong et al. |
| 2011/0055313 A1 * | 3/2011 | Little ............................ 709/203 |
| 2011/0087633 A1 * | 4/2011 | Kreuder et al. ............... 707/610 |
| 2011/0145204 A1 | 6/2011 | Maple et al. |
| 2012/0084274 A1 | 4/2012 | Renkes et al. |
| 2012/0131285 A1 | 5/2012 | Leshchiner et al. |
| 2012/0166889 A1 | 6/2012 | El-Kersh et al. |
| 2012/0210094 A1 | 8/2012 | Blocksome et al. |
| 2013/0066949 A1 * | 3/2013 | Colrain et al. .......... G06F 9/466 709/203 |

\* cited by examiner

SYSTEM AND METHOD FOR SUPPORTING READ-ONLY OPTIMIZATION IN A TRANSACTIONAL MIDDLEWARE ENVIRONMENT

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, which application is herein incorporated by reference.

CROSS REFERENCE TO RELATED APPLICATIONS

This application is related to the following patent applications, each of which is hereby incorporated by reference in its entirety:

U.S. Patent Application entitled "SYSTEM AND METHOD FOR SHARING GLOBAL TRANSACTION IDENTIFIER (GTRID) IN A TRANSACTIONAL MIDDLEWARE ENVIRONMENT", application Ser. No. 13/829,176, filed Mar. 14, 2013; and U.S. Patent Application entitled "SYSTEM AND METHOD FOR SUPPORTING APPLICATION INTEROPERATION IN A TRANSACTIONAL MIDDLEWARE ENVIRONMENT", application Ser. No. 13/829,246, filed Mar. 14, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are generally areas that embodiments of the invention are intended to address.

SUMMARY

Systems and methods are provided for supporting processing a transaction with a plurality of transaction branches. A transaction manager operates to send, to a resource manager, a prepare request for each said transaction branch in the plurality of transaction branches with the exception of at least one transaction branch. Furthermore, after receiving an indication from the resource manager that the received preparation requests are handled successfully (i.e. the transaction branch is read-only and has been committed), the transaction manager operates to send a commit request to commit said at least one transaction branch to the resource manager.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the OracleTuxedo® environment as an example for a transactional middleware machine environment. It will be apparent to those skilled in the art that other types of transactional middleware machine environments can be used without limitation.

Described herein are systems and methods that can support read-only optimization in a transactional middleware environment.

Global Transaction

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:

All portions either succeed or have no effect.

Operations are performed that correctly transform the resources from one consistent state to another.

Intermediate results are not accessible to other transactions, although other processes in the same transaction may access the data.

All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Figure 1:
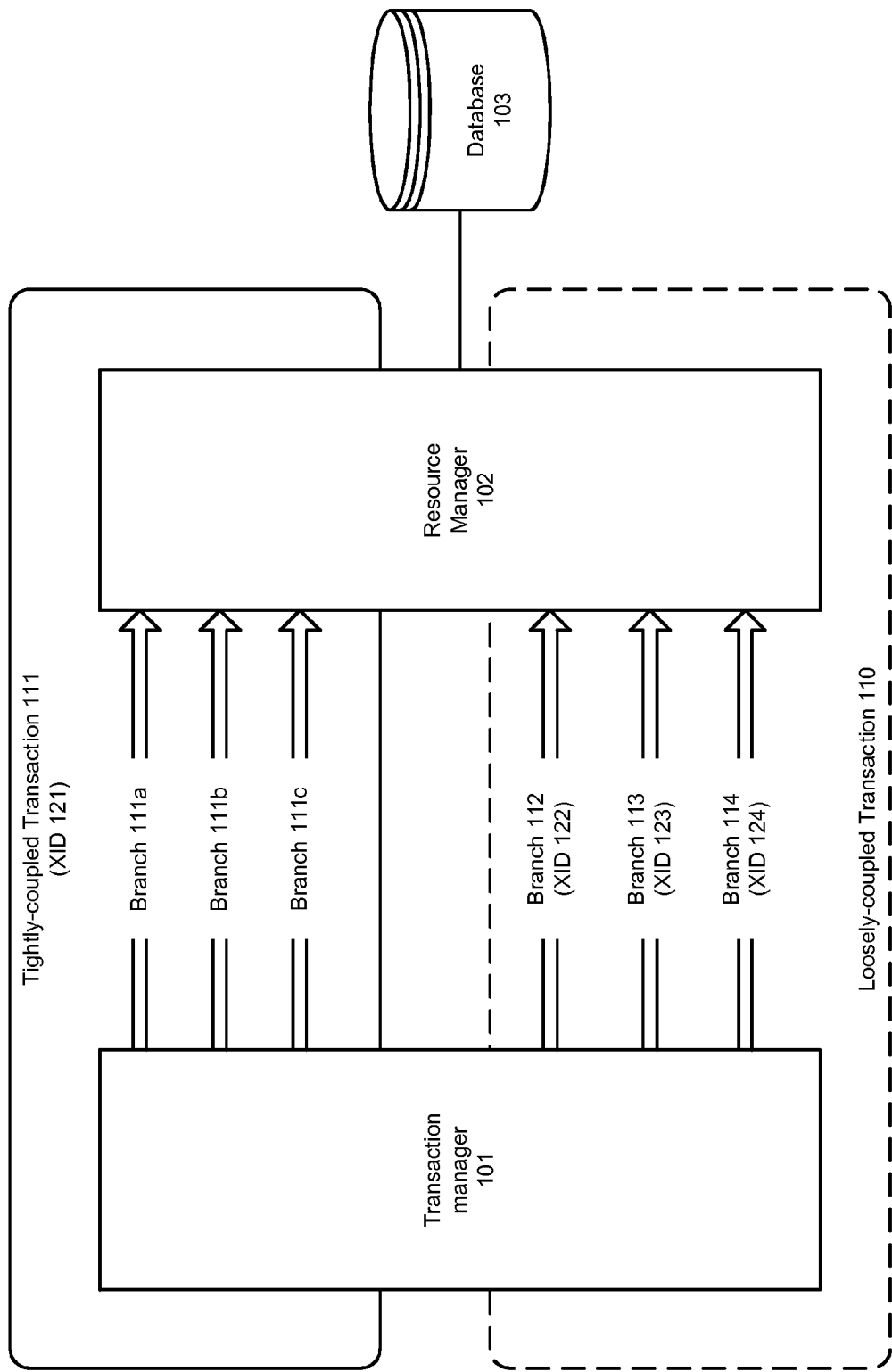
FIG. 1 shows an illustration of supporting different types of transactions in a transactional middleware machine environment, in accordance with an embodiment of the invention.

FIG. 1 shows an illustration of supporting different types of transactions in a transactional middleware machine environment, in accordance with an embodiment of the invention. As shown in FIG. 1, a transactional environment 100 can include a transaction manager (TM) 101, a resource manager (RM) 102, and a database 103.

Furthermore, the transactional environment 100 can support one or more transactions. Using the Open Group Distributed Transaction Processing (DTP) Model, the transaction manager (TM) 101 can construct transaction trees for various transactions with either tightly-coupled or loosely-coupled relationships with a resource manager (RM) 102. The coupling of the relationships can be determined in the way that the local services are defined, e.g. in the DMCONFIG file for the Oracle Tuxedo system.

As shown in FIG. 1, the transaction Manager (TM) can define either a tightly-coupled transaction 111 or a loosely-coupled transaction 110 in the transactional environment 100.

The tightly-coupled transaction 111 can include a plurality of transaction branches, e.g. branches 111a-111c, each of which can have the same transaction identifier (XID) 121. The common XID 121 can be used by all processes participating in the same global transaction 111 and accessing the same resource manager (RM) 102.

This tightly-coupled relationship can maximize data sharing between processes. For example, XA-compliant RMs can share locks for resources used by processes having the same XID. Additionally, the Tuxedo system can achieve the tightly-coupled relationship through the group concept. In Tuxedo, the work done by a group on behalf of a given global transaction belongs to the same transaction branch, and all the processes can be given with the same XID.

On the other hand, the loosely-coupled transaction 110 can include a plurality of transaction branches, e.g. branches 112-114, each of which can have a different transaction identifier (XID). As shown in FIG. 1, branch 112 can have a XID 122, branch 113 can have a XID 123, and branch 114 can have a XID 124.

The TM 101 can generate a transaction branch for each part of the work in support of the global transaction. For example, a loosely-coupled relationship can be created in the Tuxedo system when each group participating in the same global transaction defines a transaction branch.

The resource manager (RM) 102 can handle each transaction branch in the loosely-coupled transaction 110 separately, and there is no sharing of data or of locks between the transaction branches. Furthermore, deadlocks, which may result in the rollback of the global transaction, can occur between the transaction branches in the loosely-coupled transaction 110.

Two-phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 2:
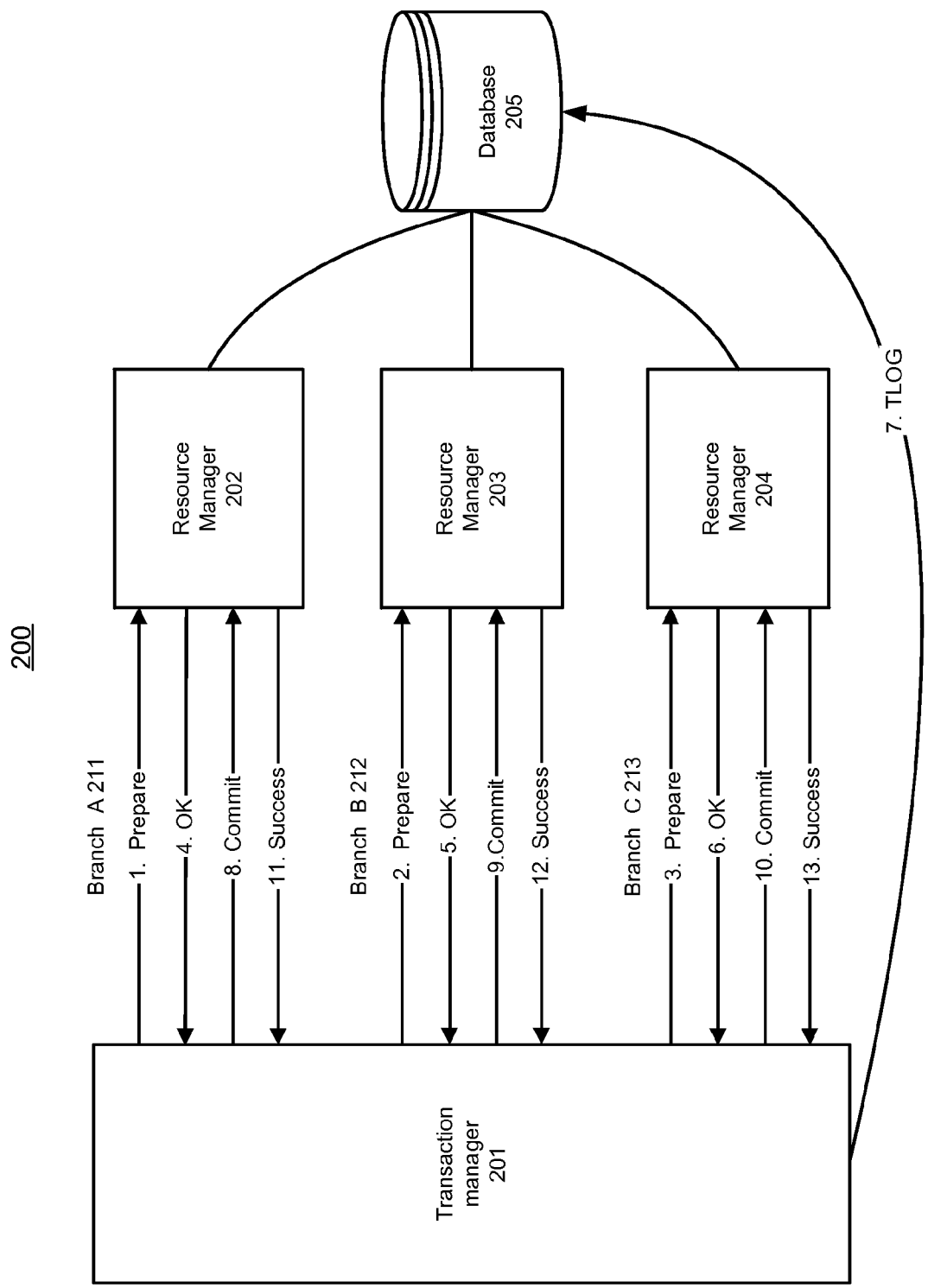
FIG. 2 shows an illustration of supporting two-phase commit in a transactional middleware machine environment.

FIG. 2 shows an illustration of supporting two-phase commit in a transactional middleware machine environment. As shown in FIG. 2, a transactional environment 200 can include a transaction manager 201 that supports the execution of various transactions, and one or more resource managers 202-204 that manage one or more data source, e.g. a database 205.

For example, the transaction manager 201 can execute a transaction that involves transaction branch A 211, transaction branch B 212, and transaction branch C 213, each of which can be executed against a resource manager 202-204 respectively. If any branch fails in the transaction, the transaction manager 201 can help the resource manager 202-204 decide whether to commit, or roll back, the transaction.

As shown in FIG. 2, the transaction manager 201 can send a prepare instruction to the resource manager 202-204 on all three branches (steps 1, 2, and 3). After the resource managers 202-204 return an "OK" vote (steps 4, 5 and 6), the transaction manager 201 can write a transaction log to the database 205 (step 7).

The transaction log (TLOG) may be written either to files, or to a database, so that the transaction manager 201 can have enough information to recover the transaction if any branch fails during the commit phase.

Then, the transaction manager 201 can instruct the resource manager 202-204 to commit all three branches (steps 8, 9 and 10). The resource manager 202-204 can inform the transaction manager 201 after successfully completing the commit phase (steps 11, 12 and 13).

Read-Only Optimization

In accordance with an embodiment of the invention, a read-only optimization can be used to improve the performance of a transactional system without sacrificing the ACID properties of the transaction. The read-only optimization can reduce the phases involved in executing a transaction and can eliminate the transaction log (TLOG).

Figure 3:
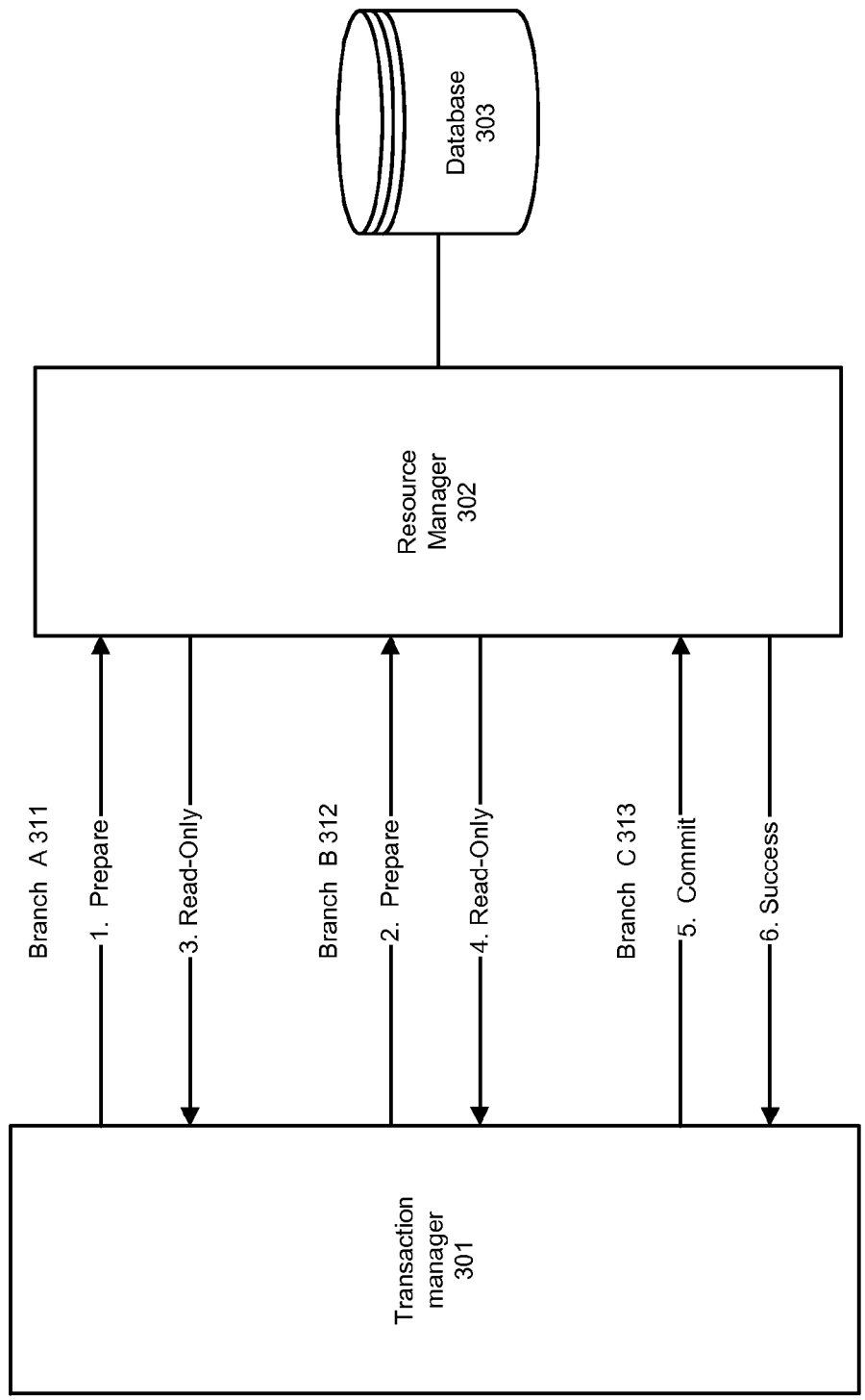
FIG. 3 shows an illustration of supporting read-only optimization in a transactional middleware machine environment, in accordance with an embodiment of the invention.

FIG. 3 shows an illustration of supporting read-only optimization in a transactional middleware machine environment, in accordance with an embodiment of the invention. As shown in FIG. 3, a transactional environment 300 can include a transaction manager (TM) 301, a resource manager (RM) 302, and a database 303.

The transaction manager 301 can execute a transaction that involves transaction branch A 311, transaction branch B 312, and transaction branch C 313, each of which can be executed against a resource manager 302 that manage one or more data source, e.g. a database 303.

In accordance with an embodiment of the invention, using the read-only optimization, the transaction manager 301 can withhold one branch during the prepare phase. As shown in FIG. 3, the transaction manager 301 can invoke a prepare operation on the branches A-B 311-312 of the transaction with the branch C 313 on hold (steps 1-2).

The transaction manager 301 can randomly pick a branch form the branches A-C 311-313 to hold. Alternatively, the transaction manager 301 can decide to hold a branch that can perform the fastest execution.

Furthermore, when each of these transaction branches A-B 311-312 returns a "Read-Only" vote (steps 3-4), the transaction manager 301 can invoke a commit operation on the branch C 313 directly (step 5), without invoking a prepare operation and/or writing a TLOG.

The "Read-Only" vote returned by the resource manager 302 indicates that no data on the branches has been modified. The transaction manager 301 can safely assume that the branches A-B 311-312 are completed and that no commit operations on the branches are necessary for this transaction.

Additionally, the transaction manager 301 can save a state of the branch C 313 to the database 303 while committing the branch C 313 (step 5). Thus, if the commit fails, the transaction manager 301 can recover the transaction by rolling back the branch C 313.

Using the read-only optimization, the system can improve the performance of a transaction by eliminating the TLOG. Furthermore, as shown in FIG. 3, the system can save a commit operation on the branches A-B 311-312, and a prepare operation on the branch C 313.

Many Tuxedo applications uses on-line transaction process (OLTP), which runs on the same RM (one instance or more) and can taking advantage of the read-only optimization in a database, such as an Oracle Database. For a global transaction involving more than one Tuxedo group, Tuxedo can automatically hold one transaction branch which can be performed the fastest and do prepare stage on the other branches. If, and only if, all the other branches return a Read-only vote, Tuxedo can perform a commit operation directly on the branch on hold, without writing a TLOG and performing a prepare operation.

Figure 4:
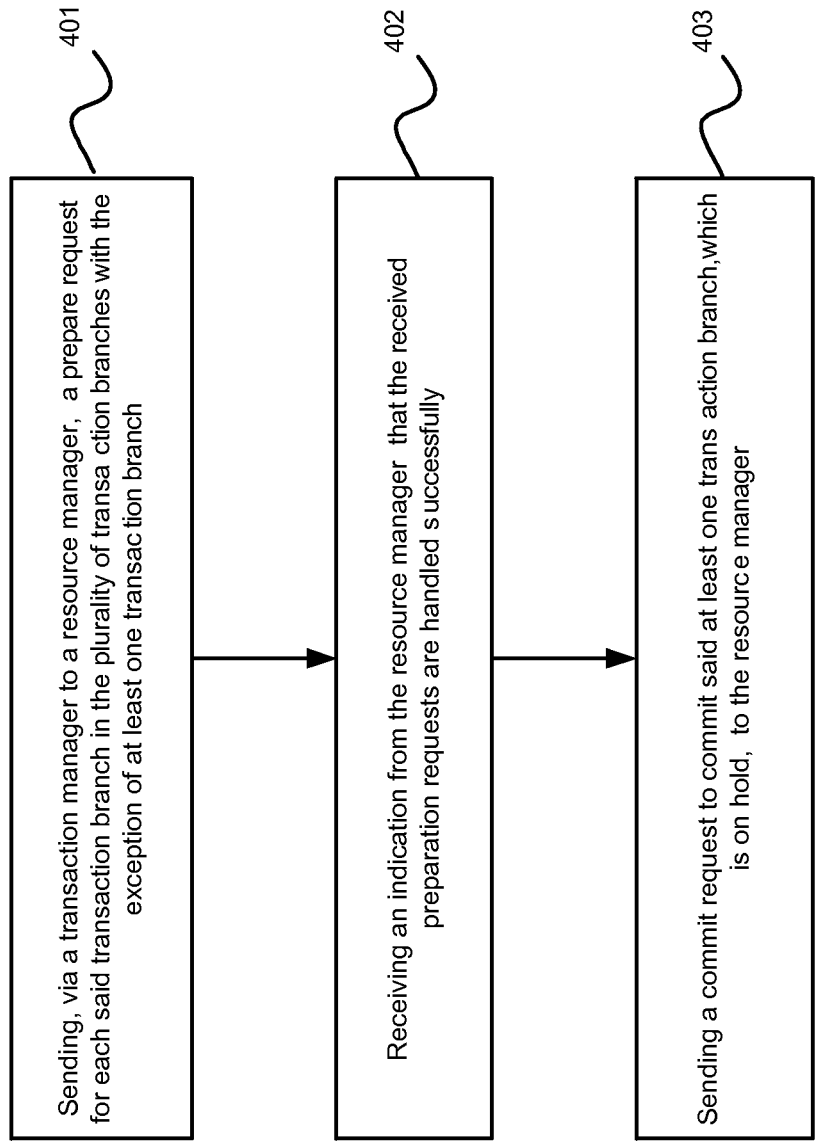
FIG. 4 illustrates an exemplary flow chart for supporting read-only optimization in a transactional middleware machine environment, in accordance with an embodiment of the invention.

FIG. 4 illustrates an exemplary flow chart for supporting read-only optimization in a transactional middleware machine environment, in accordance with an embodiment of the invention. As shown in FIG. 4, at step 401, a transaction manager can send, to a resource manager, a prepare request for each said transaction branch in the plurality of transaction branches with the exception of at least one transaction branch. Then, at step 402, the transaction manager can receive an indication from the resource manager that the received preparation requests are handled successfully. Furthermore, at step 403, the transaction manager can send a commit request to the resource manager to commit the at least one transaction branch, which is on hold.

Reverting to Two-phase Commit

Figure 5:
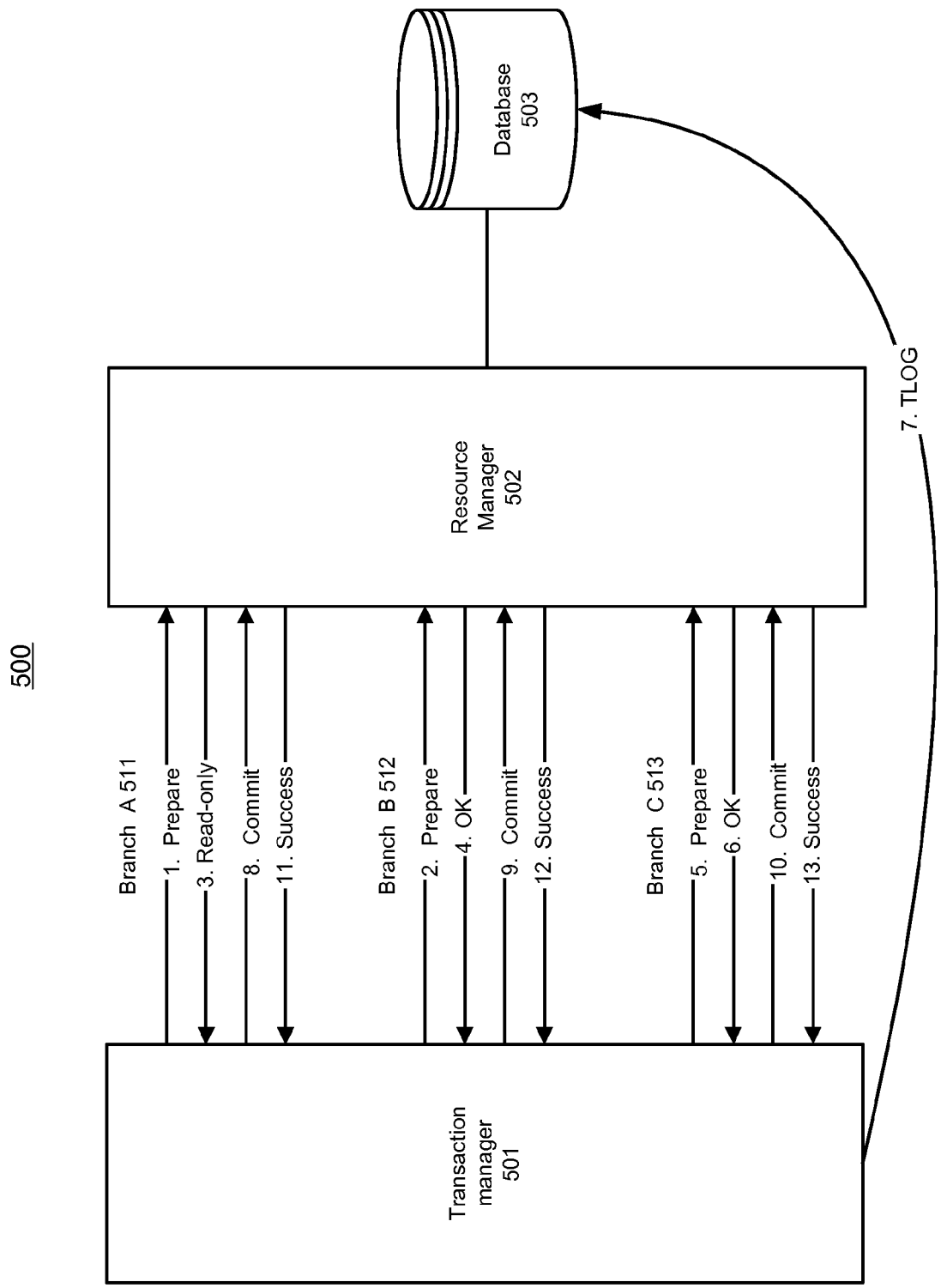
FIG. 5 shows an illustration of supporting read-only optimization for a tightly coupled transaction across multiple transaction domains in a transactional middleware machine environment, in accordance with an embodiment of the invention.

FIG. 5 shows an illustration of reverting to two-phase commit in a transactional middleware machine environment, in accordance with an embodiment of the invention. As shown in FIG. 5, a transactional environment 500 can include a transaction manager (TM) 501, a resource manager (RM) 502, and a database 503.

The transaction manager 501 can execute a global transaction that involves transaction branch A 511, transaction branch B 512, and transaction branch C 513, each of which can be executed against a resource manager 502 that manage one or more data source, e.g. a database 503.

In accordance with an embodiment of the invention, the transaction manager 501 can automatically find out whether the resource manager 502 supports the read-only optimization. The transaction manager 501 can take advantage of the read-only optimization when the resource manager 502 supports the read-only optimization. Otherwise, the transaction manager 501 can revert to the two-phase commit protocol.

For example, the transaction manager 501 can invoke a prepare operation on the branches A-B 511-512 of the transaction with the branch C 513 on hold (steps 1-2). When the resource manager (RM) 502 does not support the read-only optimization, or the transaction is loosely coupled, the resource manager (RM) 502 can return an "OK" vote instead of the "Read-Only" vote.

As shown in FIG. 5, the branch B 512 returns an "OK" vote, while the branch B 512 returns a "Read-Only" vote (steps 3-4). Then, the transaction Manager 501 can revert to a two-phase commit protocol, where the transaction manager 601 can issue a prepare request on the branch C 513, which is on hold, and write a TLOG (steps 5-7).

Furthermore, following the two-phase-commit (2PC) protocol, the transaction manager 501 can invoke a commit operation on each of the branches A-C 511-513 (steps 8-10). Then, the resource manager (RM) 502 can inform the transaction manager 501 for each of the branches A-C 511-513 that is successfully committed (steps 11-13).

In accordance with an embodiment of the invention, the coordinator of transaction may not send commit request to a branch which indicates read-only at the prepare stage. Thus, the system can forgo the step 8 and step 11.

Tightly Coupled Transaction Crossing Multiple Transaction Domains

Figure 6:
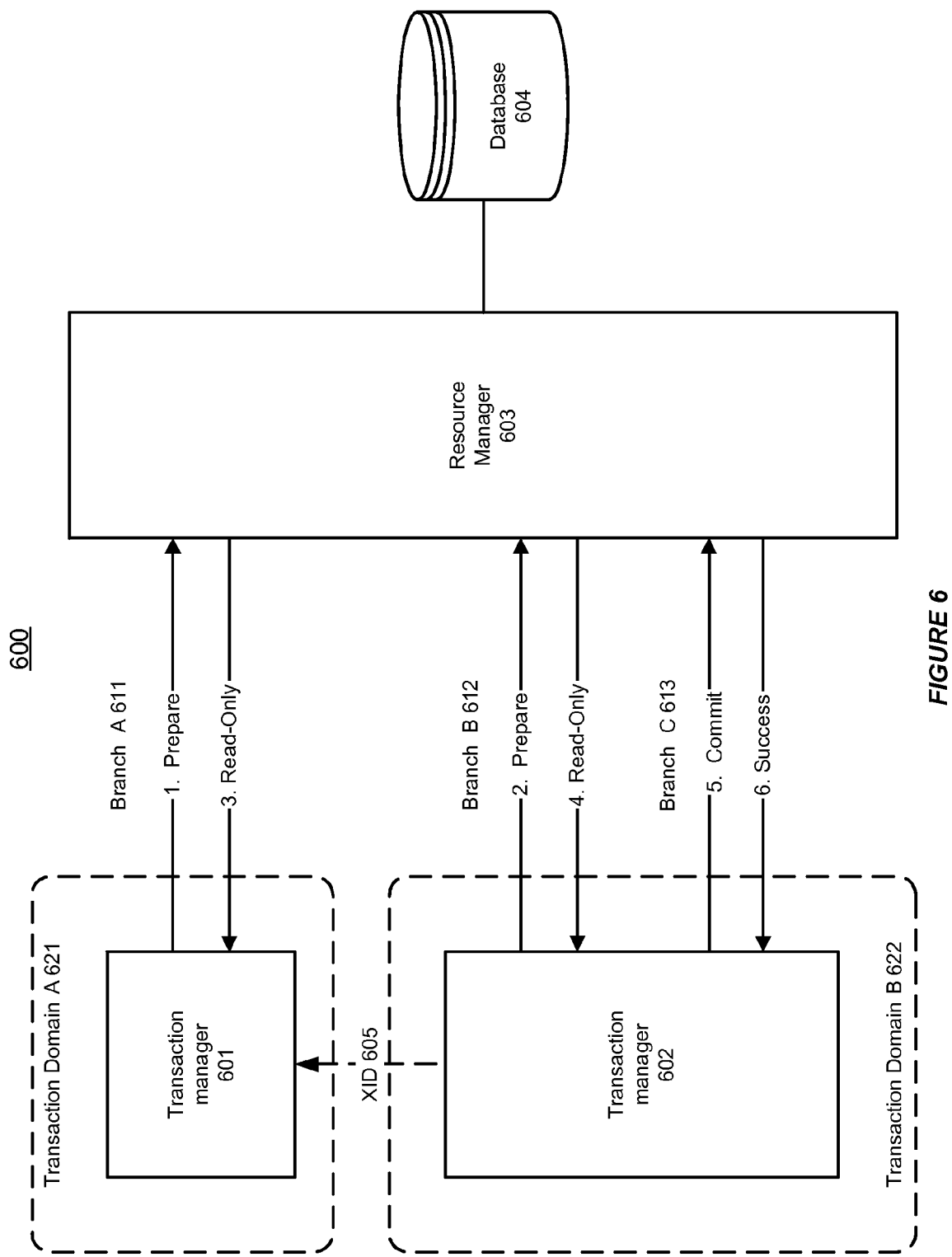
FIG. 6 shows an illustration of reverting to two-phase commit in a transactional middleware machine environment, in accordance with an embodiment of the invention.

FIG. 6 shows an illustration of supporting read-only optimization for a tightly coupled transaction across multiple transaction domains in a transactional middleware machine environment, in accordance with an embodiment of the invention. As shown in FIG. 6, the transactional environment 600 includes multiple transaction domains, e.g. transaction domains A-B 621-622, and a resource manager 603 that manages one or more data source, e.g. a database 604.

The transaction manager 602 can initiate a transaction that may involve multiple transaction domains 621-622. The global transaction can include multiple transaction branches A-C 611-613 that are tightly-coupled. The transaction branches A-C 611-613 can use the same transaction identifier (XID) 605 and can access the same resource manager 603.

As shown in FIG. 6, the transaction manager 601 can send a prepare instruction for the branch A 611 (Step 1), and the transaction manager 602 can send a prepare instruction for the branch B 612 (Step 2). The resource manager 603 can be aware that the two prepare operations are for one tightly coupled transaction, since the two prepare operations use the same XID 605.

Then, after receiving the "Read-Only" vote from the resource manager 603 for both the branches A-B 611-612 (Step 2 and step 4), the transaction manager 602 can send a commit instruction to the resource manager 603 on branch C 613 directly (Step 5). Accordingly, the resource manager 603 can return a success vote after committing the transaction (Step 6).

In the example of Tuxedo, if a local TDomain is involved in an XA transaction coming from a remote TDomain, the global transaction identifier (GTRID), which may be referred to as the common grid, can be reused in the local domain to access RMs for this global transaction. Thus, the branches on these TDomains can be tightly coupled, if they are performed in same database and read-only optimization can be used.

Non-Conforming Resource Manager

Figure 7:
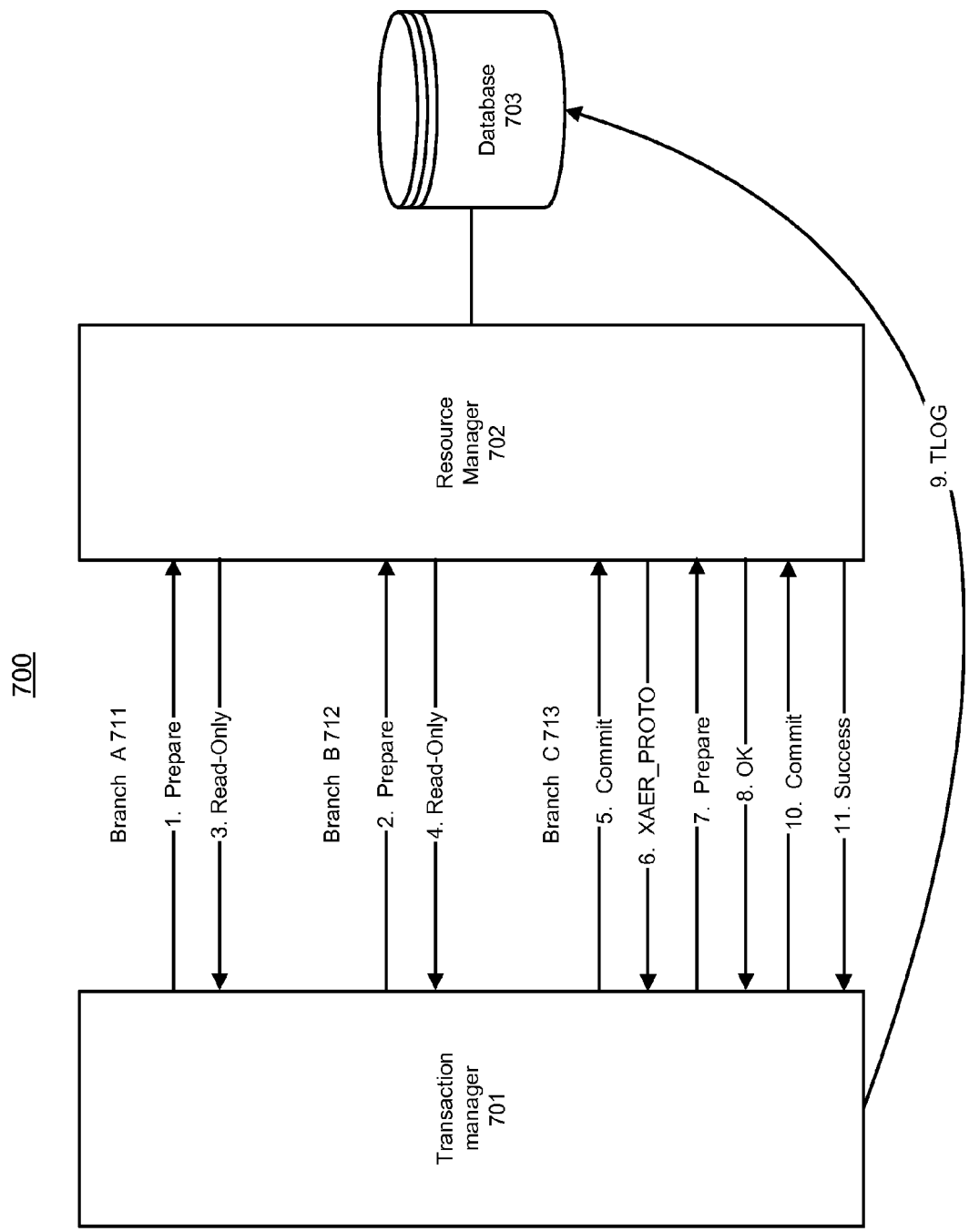
FIG. 7 shows an illustration of reverting to two-phase commit in a transaction that involves a non-conforming resource manager in a transactional middleware machine environment, in accordance with an embodiment of the invention.

FIG. 7 shows an illustration of reverting to two-phase commit in a transaction that involves a non-conforming resource manager in a transactional middleware machine environment, in accordance with an embodiment of the invention. As shown in FIG. 7, a transactional environment 700 can include a transaction manager (TM) 701, a resource manager (RM) 702, and a database 703.

The transaction manager 701 can execute a global transaction that involves transaction branch A 711, transaction branch B 712, and transaction branch C 713, each of which can be executed against a resource manager 702 that manage one or more data sources, e.g. a database 703.

In accordance with an embodiment of the invention, the resource manager 702 may not support the one-phase commit optimization. In such a case, the transaction manager 701 can treat the resource manager 702 as not supporting the read-only optimization, thus reverting to the two-phase commit protocol.

For example, the transaction manager 701 can invoke a prepare operation on the branches A-B 711-712 of the transaction with the branch C 713 on hold (steps 1-2), and receives a read-only vote on each of the branches A-B 711-712 (steps 3-4). The transaction manager 701 subsequently (step 5) can try to commit branch C 713, and receives an "XAER_PROTO" vote from the resource manager 702 (step 6), which indicates that the resource manager 702 can not commit the global transaction on branch C 713. Accordingly, the transaction manager 701 can revert to the two-phase commit protocol, which include the steps of preparing branch C 713 (steps 7-8), writing a TLOG (step 9), and committing the branch C 713 (steps 10-11).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for processing a transaction with a plurality of transaction branches, the method comprising:
   determining, within a plurality of transaction branches participating in a transaction, at least one transaction branch to be used as an on hold transaction branch;
   sending, via a transaction manager to a resource manager, a prepare request for each other transaction branch in the plurality of transaction branches, with the exception of the on hold transaction branch;
   receiving, at the transaction manager, an indication from the resource manager that each prepare request received by the resource manager is associated with data on a read-only transaction branch that is not modified by the transaction; and
   sending, to the resource manager, in response to receiving the indication that each prepare request received by the resource manager is associated with data on a read-only transaction branch, a commit request to commit the on hold transaction branch, wherein the commit request is then invoked on the on hold transaction branch, to process the transaction.

2. The method of claim 1, further comprising:
   connecting the resource manager to a database in a database cluster, or an instance of a database in a database cluster.

3. The method of claim 1, further comprising:
   determining, via the transaction manager, the on hold transaction branch based on a fastest execution time for each of the plurality of transaction branches.

4. The method of claim 1, further comprising:
   configuring the plurality of transaction branches to be executed within one domain.

5. The method of claim 1, further comprising:
   configuring the plurality of transaction branches to be executed and to span multiple tightly coupled domains.

6. The method of claim 1, further comprising reverting from a read only optimization protocol to a two-phase commit protocol by sending a prepare request on at least one said branch being held, upon receiving an indication from the resource manager that one or more transaction branches have different transaction identifiers.

7. The method of claim 1, further comprising:
   committing the transaction without saving a transaction log.

8. The method of claim 1, further comprising:
   rolling back the transaction when at least one transaction branch fails.

9. The method of claim 1, wherein the resource manager determines a particular transaction branch is a read-only transaction branch in response to receiving a read-only vote from that particular transaction branch.

10. The method of claim 1, wherein the indication from the resource manager that each prepare request received by the resource manager is associated with data on a read-only transaction branch, includes that a plurality of prepare requests are associated with data on a plurality of read-only transaction branches.

11. A system for processing a transaction with a plurality of transaction branches, comprising:
   one or more microprocessors;
   a transaction manager running on the one or more microprocessors, wherein the transaction manager operates to
      determine, within a plurality of transaction branches participating in a transaction, at least one transaction branch to be used as an on hold transaction branch;
      send, via a transaction manager to a resource manager, a prepare request for each other transaction branch in the plurality of transaction branches, with the exception of the on hold transaction branch;
      receive, at the transaction manager, an indication from the resource manager that each prepare request received by the resource manager is associated with data on a read-only transaction branch that is not modified by the transaction; and
      send, to the resource manager, in response to receiving the indication that each prepare request received by the resource manager is associated with data on a read-only transaction branch, a commit request to commit the on hold transaction branch, wherein the commit request is then invoked on the on hold transaction branch, to process the transaction.

12. The system according to claim 11, wherein:
the resource manager is connected to a database in a database cluster, or an instance of a database in a database cluster.

13. The system of claim 11, wherein:
the transaction manager determines the on hold transaction branch based on a fastest execution time for each of the plurality of transaction branches.

14. The system of claim 11, wherein:
the plurality of transaction branches are executed within one domain.

15. The system of claim 11, wherein:
the plurality of transaction branches are executed span multiple tightly coupled domains.

16. The system of claim 11, wherein:
the transaction manager reverts from a read only optimization protocol to a two-phase commit protocol by sending a prepare request on the at least one branch being held, upon receiving an indication from the resource manager that one or more transaction branches have different transaction identifiers.

17. The system of claim 11, wherein:
the transaction manager commits the transaction without saving a transaction log.

18. The system of claim 11, wherein the resource manager determines a particular transaction branch is a read-only transaction branch in response to receiving a read-only vote from that particular transaction branch.

19. The system of claim 11, wherein the indication from the resource manager that each prepare request received by the resource manager is associated with data on a read-only transaction branch, includes that a plurality of prepare requests are associated with data on a plurality of read-only transaction branches.

20. A non-transitory machine readable storage medium having instructions stored thereon that when executed cause a system to perform the steps comprising:
determining, within a plurality of transaction branches participating in a transaction, at least one transaction branch to be used as an on hold transaction branch;
sending, via a transaction manager to a resource manager, a prepare request for each other transaction branch in the plurality of transaction branches, with the exception of the on hold transaction branch;
receiving, at the transaction manager, an indication from the resource manager that each prepare request received by the resource manager is associated with data on a read-only transaction branch that is not modified by the transaction; and
sending, to the resource manager, in response to receiving the indication that each prepare request received by the resource manager is associated with data on a read-only transaction branch, a commit request to commit the on hold transaction branch, wherein the commit request is then invoked on the on hold transaction branch, to process the transaction.

* * * * *